US010627877B2

(12) United States Patent
Tower et al.

(10) Patent No.: US 10,627,877 B2
(45) Date of Patent: Apr. 21, 2020

(54) AIR IMPEDING STRUCTURES WITH SNAP-IN TABS

(71) Applicant: HEWLETT PACKARD ENTERPRISE DEVELOPMENT LP, Houston, TX (US)

(72) Inventors: Daniel W. Tower, Houston, TX (US); Pinche Tsai, Houston, TX (US); Kevin F. Labbe, Houston, TX (US); James Jeffery Schulze, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 354 days.

(21) Appl. No.: 15/475,351

(22) Filed: Mar. 31, 2017

(65) Prior Publication Data
US 2018/0283807 A1    Oct. 4, 2018

(51) Int. Cl.
*G06F 1/20* (2006.01)

(52) U.S. Cl.
CPC ...................... *G06F 1/20* (2013.01)

(58) Field of Classification Search
CPC .......................................... G06F 1/20
USPC .......................................... 454/184
See application file for complete search history.

(56) References Cited

U.S. PATENT DOCUMENTS

| 6,154,368 A * | 11/2000 | Scofield | H01L 23/467 |
| | | | 165/80.3 |
| 7,002,797 B1 * | 2/2006 | Wittig | H05K 7/20154 |
| | | | 165/80.3 |
| 7,474,528 B1 | 1/2009 | Olesiewicz et al. | |
| 7,599,180 B2 | 10/2009 | Ong et al. | |
| 7,652,891 B2 | 1/2010 | Lucero et al. | |
| 7,817,417 B2 | 10/2010 | Franz et al. | |
| 7,843,683 B2 | 11/2010 | Sufffern et al. | |
| 8,477,495 B2 * | 7/2013 | Sun | H05K 7/20145 |
| | | | 361/679.47 |
| 8,502,087 B2 * | 8/2013 | Medrano | H05K 7/1421 |
| | | | 174/382 |
| 8,675,365 B2 * | 3/2014 | Pav | G06F 1/206 |
| | | | 165/122 |
| 2006/0227505 A1 | 10/2006 | Miyamoto et al. | |

OTHER PUBLICATIONS

Quick Start Guide—HTML Format for the Intel® Server System SR1600UR, Sep. 8, 2016, 11 Pgs., http://www.intel.in/content/www/in/en/support/boards-and-kits/00000752.html.

* cited by examiner

*Primary Examiner* — Gregory L Huson
*Assistant Examiner* — Dana K Tighe
(74) *Attorney, Agent, or Firm* — Hewlett Packard Enterprise Patent Department

(57) ABSTRACT

Examples described herein include air impeding structures with snap-in tabs. In some examples, an air impeding structure for a processing unit socket cover includes a main body encloses an interior space, a first snap-in tab, and a second snap-in tab. The main body may include a first curved wall at a first end of the main body connected to a second curved wall at a second end of the main body. The first snap-in tab extends below the first end of the main body and is recessed in relation to the first curved wall. The second snap-in tab extends below the second end of the main body and is recessed in relation to the second curved wall.

17 Claims, 5 Drawing Sheets

AIR IMPEDING STRUCTURES WITH SNAP-IN TABS

BACKGROUND

A computing device may have sockets for the attachment of processing units, such as a central processing unit. In some examples, a computing device may be underpopulated, in which at least one socket is not populated with a processing unit.

BRIEF DESCRIPTION OF THE DRAWINGS

The following detailed description references the drawings, wherein.

DETAILED DESCRIPTION

Figure 1:
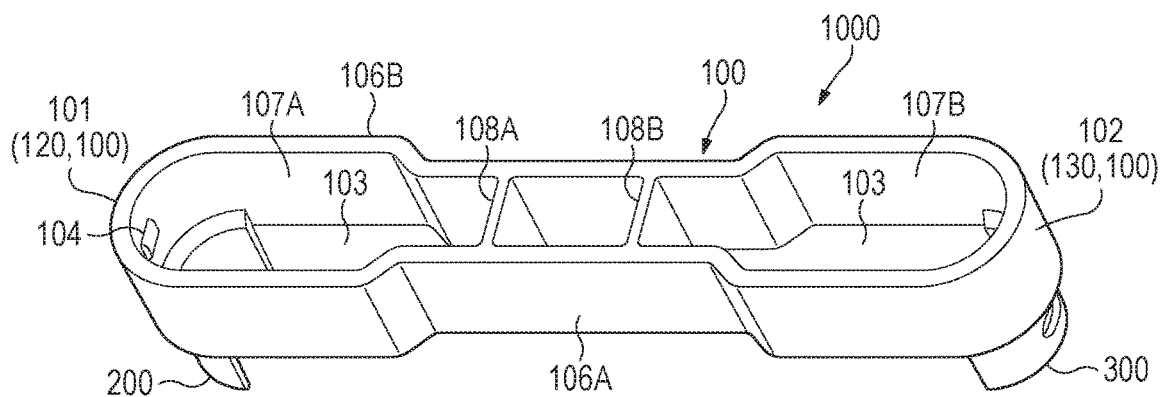
FIG. 1 illustrates a top perspective view of an air impeding structure for a processing unit socket cover, according to some examples.

A computing device that may accommodate a specific number of processing units may come populated with less than the specific number of processing units. For example, a computing device may offer sockets for three or more processing units but may come populated with one or two processing units. In these situations, the computing device has at least one unpopulated socket.

Unpopulated sockets (i.e. sockets without attached processing units) may affect the heat dissipation of the computing device. For example, the computing device and associated cooling systems may be designed for optimal operation while fully populated. If a processing unit socket is unpopulated, the air flow through that area of the computing device may increase due to the lack of air flow impedance that would be provided by the processing unit.

In some examples, an unpopulated processing unit socket may be protected by a cover that sits on top of an unpopulated processing unit. The cover may have air impedance structure to create air flow impedance that would normally be provided by the processing unit. However, even though different computing devices may have similarly sized unpopulated sockets to fit the same processing units, the power demands of those computing devices may be different from each other. For example, a first computing device may have the need for additional air flow impedance in relation to a second computing device for the same unpopulated socket due to electronic components in the first computing device that are not present in the second computing device. Accordingly, a static or unalterable air flow impedance structure for a processing unit socket cover is unadaptable to multiple computing devices as it may be thermally compatible for one computing device and not thermally compatible for another computing device.

Examples disclosed herein address these technical challenges by providing air impedance structures that may attach to each other to adapt to the specific thermal needs of the computing device in which the air impedance structures are installed. In some examples, the air impeding structure includes a main body that encloses an upper interior space. Two snap-in tabs extend below the main body. The snap-in tabs and the main body include engagement features that allow the main body of one air impedance structure to engage with the snap-in tabs of another air impedance structure. Thus, examples disclosed herein allow for stackable air impedance structures which may be connected to each other to create different heights for appropriate air flow properties of the computing system. The snap-in tabs also allow for the air impedance structures to attach to a socket cover.

In some examples, an air impeding structure for a processing unit socket cover comprises a main body with a first end and a second end, a first snap-in tab extending below the first end of the main body, and a second snap-in tab extending below the second end of the main body. The main body comprises a first curved wall at the first end connected to a second curved wall at the second end. The main body also encloses an interior space. The first snap-in tab is recessed in relation to the first curved wall and the second snap-in tab is recessed in relation to the second curved wall.

In some examples, an air impeding structure for a processing unit socket cover comprises a circumferential wall enclosing an upper interior space. The circumferential wall includes a first rounded end, a second rounded end, a first sidewall connecting the first rounded end and the second rounded end, and a second sidewall connecting the first rounded end and the second rounded end. The air impeding structure also includes a first snap-in tab connected to the circumferential wall below the first rounded end, and a second snap-in tab connected to the circumferential wall below the second rounded end.

In some examples, an air impeding structure for a processing unit socket cover comprises a first baffle and a second baffle. The first baffle includes a first circumferential wall enclosing an upper interior space, a first snap-in tab extending below the first circumferential wall, and a second snap-in tab extending below the first circumferential wall. The first snap-in tab comprises an external surface with a first perforation and the second snap-in tab comprises an external surface with a second perforation. The second baffle includes a second circumferential wall enclosing a lower interior space, a third snap-in tab extending below the second circumferential wall, and a fourth snap-in tab extending below the second circumferential wall. The second circumferential wall comprises a first internal surface with a first flange and a second surface with a second flange. The first flange engages with the first perforation of the first snap-in tab and the second flange engages with the second perforation of the second snap-in tab.

Figure 2:
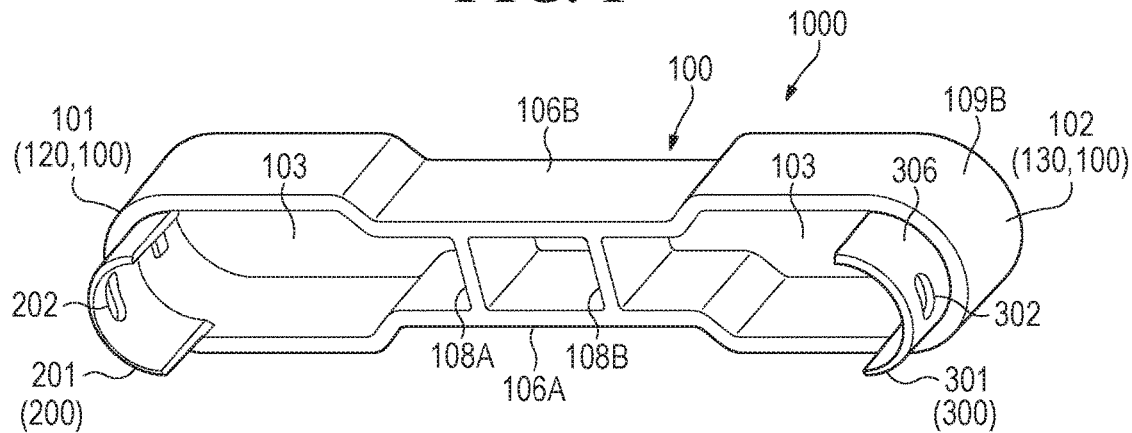
FIG. 2 illustrates a bottom perspective view of the air impeding structure of FIG. 1, according to some examples.
Figure 3:
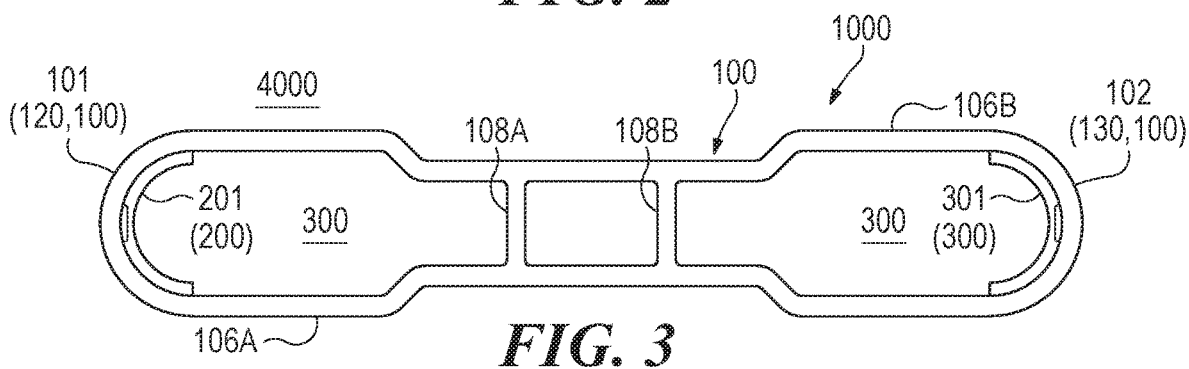
FIG. 3 illustrates a top view of the air impeding structure of FIG. 1, according to some examples.
Figure 4:
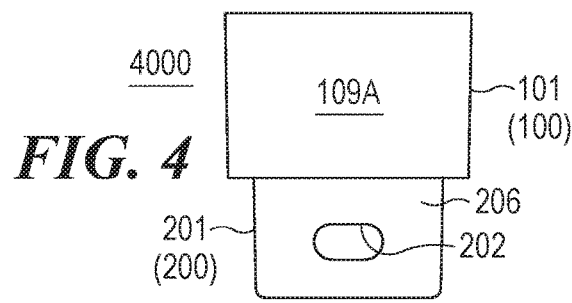
FIG. 4 illustrates a side view of the air impeding structure of FIG. 1, according to some examples.

Referring now to the figures, FIG. 1 illustrates a top perspective view of an air impeding structure 1000 for a processing unit socket cover. FIG. 2 illustrates a bottom perspective view of air impeding structure 1000. FIG. 3 illustrates a top view of air impeding structure 1000 and FIG. 4 illustrates a side view of air impeding structure 1000. As used herein, a processing unit may for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. A processing unit socket may lock the processing unit (e.g., a central processing unit) to the board of the computing device such that data can be transferred to the processing unit. A cover for the processing unit socket may cover an unpopulated socket.

Air impeding structure 1000 comprises a main body 100 with a first snap-in tab 200 and a second snap-in tab 300 connected to the main body 100. Main body 100 may have two ends 120 and 130 that are on opposite sides of each other. A first curved wall 101 is located at the first end 120 and a second curved wall 102 is located at the second end 130. In some examples, first curved wall 101 is connected to second curved wall 102 such that the main body 100 creates a circumferential wall enclosing an interior space 103. First curved wall 101 may be connected to second curved wall 102 by sidewalls 106A and 106B. In some examples, sidewalls 106A and 106B do not intersect each other. Thus, first curved wall 101, second curved wall 102, side wall 106A, and side wall 106B may together form a continuous boundary that bounds interior space 103. In some examples, and as shown in the figures, first snap-in tab 200 may be connected to main body 100 below first end 120 and second snap-in tab 300 may be connected to main body 100 below second end 130. Accordingly, interior space 103 may be characterized as an "upper" interior space in relation to the vertical location of snap-in tabs 200 and 300. In some examples, upper interior space 103 may be divided by transverse walls 108A and 108B. Transverse walls 108A and 108B may extend across upper interior space 103 to connect side wall 106A and sidewall 106B. Transverse walls 108A and 108B may allow main body 100 more structural rigidity and support. Accordingly, in examples with transverse walls 108A and 108B, upper interior space 103 may be divided into three sections.

In some examples, main body 100 has a first internal surface 107A and a second internal surface 107B. Internal surface 107A may include surfaces of first curved wall 101, sidewall 106B, and sidewall 106A. Internal surface 107B may include surfaces of second curved wall 102, sidewall 106B, and sidewall 106A. A protrusion 104 may protrude from internal surface 107A at the location of first curved wall 101. Similarly, a protrusion 105 (not visible in the figures) may protrude from internal surface 107B at the location of second curved wall 102. As will be discussed herein, protrusions 104 and 105 allow air impeding structure 1000 to engage with a second air impeding structure. For example, protrusions 104 and 105 may fit into perforations that are formed in the second air impeding structure.

As discussed above, air impeding structure 1000 comprises first snap-in tab 200 and second snap-in tab 300 that are connected to main body 100 below first end 120 and second end 130, respectively. In some examples, first snap-in tab 200 extends below first end 120 of main body 100 and second snap-in tab 300 extends below second end 130 of main body 100. First snap-in tab 200 comprises a curved portion 201 and second snap-in tab 300 comprises a curved portion 301. In some examples, curved portion 201 is shaped such that it mirrors the shape of curved wall 101 of main body 100 and curved portion 301 is shaped such that it mirrors the shape of curved wall 102 of main body 100. As used herein, an object mirrors something when the object has the same shape as something. For example, curved wall 101 may be parabolic in shape. Curved portion 201 is also parabolic in shape because curved portion 201 mirrors curved wall 101.

In some examples, and as shown in FIGS. 1, 2, and 3, first snap-in tab 200 is recessed from first curved wall 101. Similarly, second snap-in tab 300 is recessed from second curved wall 102. In other words, first curved wall 101 may have an external surface 109A and first snap-in tab 200 may have an external surface 206. External surface 206 may start at a position that is more recessed than external surface 109A in reference to an outside environment 4000 of air impeding structure 1000. Similarly, second curved wall 102 may have an external surface 109B and second snap-in tab 300 may have an external surface 306. External surface 306 may start at a position that is more recessed from an outside environment of air impeding structure 1000 than external surface 109B. This may be seen in FIGS. 3 and 4, where outside environment is shown as 4000. First snap-in tab 200 may also comprise a perforation 202 and second snap-in tab 300 may have a similar perforation 302. These perforations may be formed on the external surfaces 206 and 306, respectively. In some examples, these perforations are sized to engage protrusions 104 and 105 of main body 100.

The features of air impeding structure 1000 allow it to be repeatedly stacked upon itself to generate structures of different heights. Due to the recess of the first snap-in tab 200 from first curved wall 101 and the recess of the second snap-in tab 300 from second curved wall 102, the snap-in tabs of one air impeding structure 1000 may be placed inside the main body 100 of another air impeding structure 1000. In some examples, the snap-in tabs of one air impeding structure 1000 creates "shelves" upon which the snap-in tabs of another air impeding structure 1000 may sit. Additionally, because the curved portion 201 of snap-in tab 200 mirrors the first curved wall 101 and the curved portion 301 of snap-in tab 300 mirrors the second curved wall 102, the external surface 206 of first snap-in tab 200 may engage internal surface 107A of main body 100 and the external surface 306 of second snap-in tab 300 may engage internal surface 107B of main body 100. The mirroring of the snap-in tabs with the curved walls allow for smoother insertion of one air impeding structure 1000 into another air impeding structure 1000. The mirroring of the shapes also allow for increased friction between the air impeding structures 1000 to maintain stability of the stacked structure. Also, perforations 202 and 302 of one air impeding structure 1000 may engage with protrusions 104 and 105 of another air impeding structure 1000 to further maintain the stability of the stacked structure. In some examples, a user feedback may be sensed as a tactile indication that one air impeding structure 1000 is successfully stacked on another air impeding structure 1000 through the engagement of the protrusions with the perforations (e.g., a "snap" may be heard).

Figure 5:
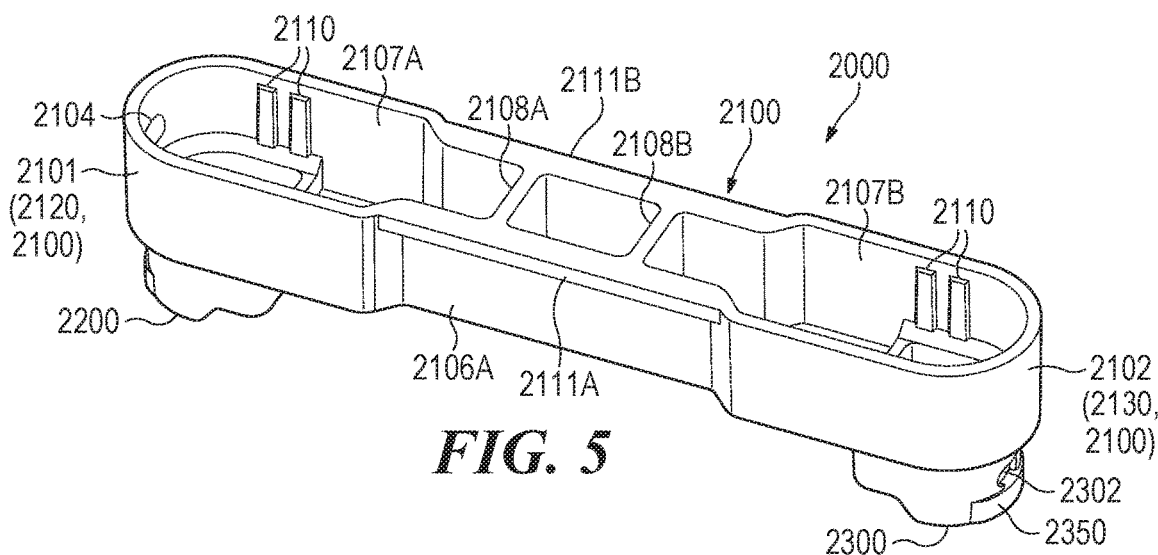
FIG. 5 illustrates a top perspective view of an air impeding structure for a processing unit socket cover, according to some examples.
Figure 6:
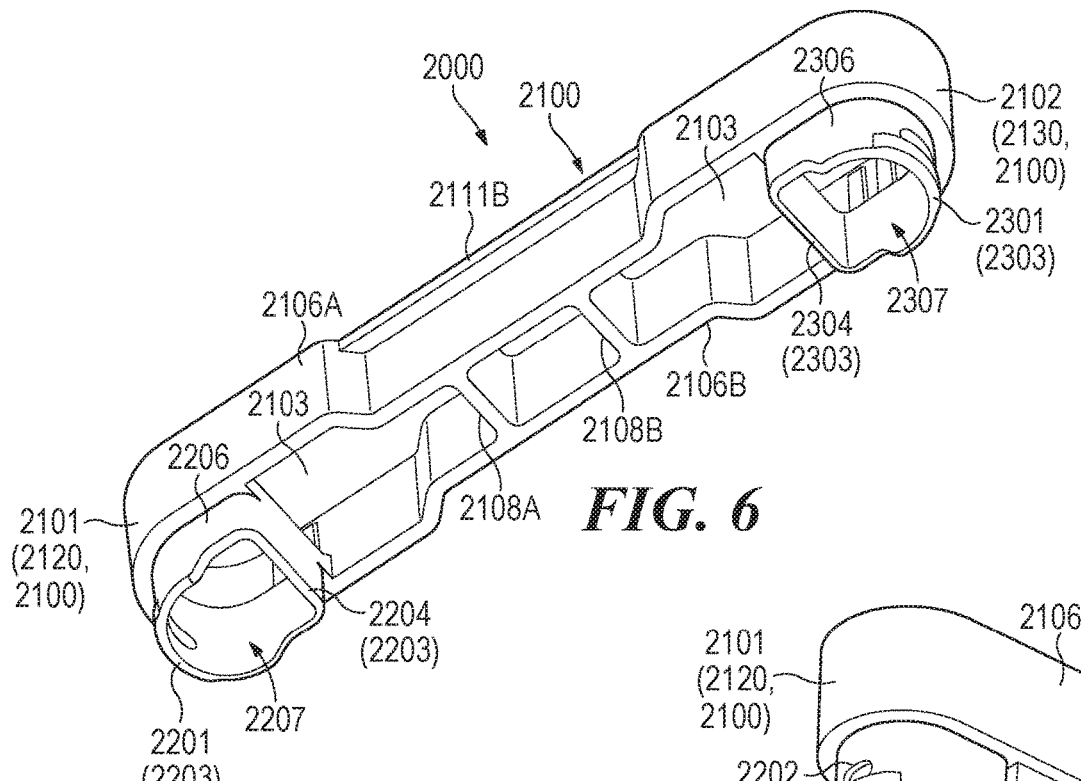
FIG. 6 illustrates a bottom perspective view of the air impeding structure of FIG. 5, according to some examples.
Figure 7:
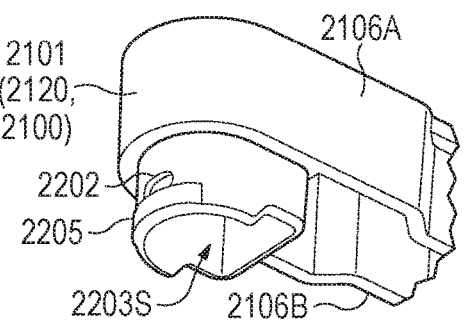
FIG. 7 illustrates a side perspective view of the air impeding structure of FIG. 5, according to some examples.

FIG. 5 illustrates a top perspective view of an air impeding structure 2000 for a processing unit socket cover. FIG. 6 illustrates a bottom perspective view and FIG. 7 illustrates a side perspective view of air impeding structure 2000. Air impeding structure 2000 is similar to air impeding structure 1000. Accordingly, components of air impeding structure 2000 that are similarly numbered to components of air impeding structure 1000 are similar to each other in structure and function (e.g., 101 is similarly numbered to 2101).

Like air impeding structure 1000, air impeding structure 2000 comprises a main body 2100 with a first snap-in tab 2200 and a second snap-in tab 2300 connected to the main body 2100. Main body 2100 is a circumferential wall that encloses an upper interior space 2103, similar to main body 100. Air impeding structure 2000 is different from air impeding structure 1000 in that air impeding structure 2000 comprises additional structural components including: at least one rib 2110, circumferential walls 2203 and 2303 for snap-in tabs 2200 and 2300, respectively, lips 2111A and 2111B on main body 2100, and curved external flanges 2205 and 2305 on external surfaces 2206 and 2306, respectively.

Rib 2110 may extend vertically along the height of main body 2100 in the interior space 2103. In some examples, rib 2110 extends vertically along the entire height of main body 2100. In other examples, rib 2110 extends vertically along a portion of the height of main body 2100. In some examples, at least one rib 2110 (e.g., one rib, two ribs, three ribs, etc.) may be on internal surface 2107A of main body 2100 and at least one rib (e.g., one rib, two ribs, three ribs, etc.) 2110 may be on internal surface 2107B of main body 2100. As discussed herein, rib 2110 may increase the engagement between two air impeding structures 2000 stacked upon each other.

As discussed above, air impeding structure 2000 may also comprise lips 2111A and 2111B on main body 2100. Lip 2111A may be located on first sidewall 2106A and lip 2111B may be located on second sidewall 2106B. In some examples, lips 2111A and 2111B are located in an area of main body 2100 that has the shortest width (e.g., a "waist" of main body 2100). Lips 2111A and 2111B add additional stability to the structure of main body 2100.

As discussed above, air impeding structure 2000 also includes first snap-in tab 2200 and second snap-in tab 2300. In contrast to first snap-in tab 200 and second snap-in tab 300, first snap-in tab 2200 and second snap-in tab 2300 may comprise circumferential walls 2203 and 2303, respectively. Circumferential wall 2203 may include a curved portion 2201 and a straight portion 2204 that connects the two ends of the curved portion 2201. Thus, curved portion 2201 and straight portion 2204 of circumferential wall 2203 may enclose a first interior space 2207. Similarly, circumferential wall 2303 may include a curved portion 2301 and a straight portion 2304 that connects the two ends of the curved portion 2301. Thus, curved portion 2301 and straight portion 2304 of circumferential wall 2303 may enclose a second interior space 2307. First interior space 2207 may be characterized as a "lower interior space" in relation to the upper interior space 2103 enclosed by main body 2100. Second interior space 2307 may also be characterized as a "lower interior space" in relation to the upper interior space 2103 enclosed by main body 2100. Circumferential wall 2203 and circumferential wall 2303 may increase the structural stability of first snap-in tab 2200 and second snap-in tab 2300.

In some examples, at least one rib 2110 may be located on internal surface 2107A such that it is vertically above the first lower interior space 2207 and at least one rib 2110 may be located on internal surface 2107B such that it is vertically above the second lower interior space 2307. Due to the spacing relationship of rib 2110 and interior spaces 2207 and 2307, rib 2110 of a first air impeding structure 2000 may engage with external surfaces 2206 and 2306 of a second air impeding structure 2000 stacked on top of a first air impeding structure 2000. Accordingly, the friction of rib 2110 rubbing against the external surfaces 2206 and 2306 may allow for additional stability of a stacked arrangement of two air impeding structures 2000.

As discussed above, air impeding structure 2100 also comprises curved external flanges 2205 and 2305. Curved external flange 2205 may protrude from external surface 2206 on first snap-in tab 2200. Curved external flange 2205 may also be located below perforation 2202. Similarly, curved external flange 2305 may protrude from external surface 2306 on second snap-in tab 2300. Curved external flange 2305 may also be located below perforation 2302. In some examples, curved external flanges 2205 and 2305 allow for increased engagement between two stacked air impeding structures 2000. For example, when first snap-in 2200 tab of one air impeding structure 2000 is inserted into main body 2100 and the upper interior space 2103 of a second air impeding structure 2000, curved external flange 2205 (of the first air impeding structure 2000) may provide a tighter fit by engaging internal surface 2107A that is below flange 2104 (of the second air impeding structure 2000). Similarly, when second snap-in tab 2300 is inserted into main body 2100 and the upper interior space 2103, curved external flange 2305 may provide a tighter fit by engaging internal surface 2107B that is below flange 2204.

Figure 8:
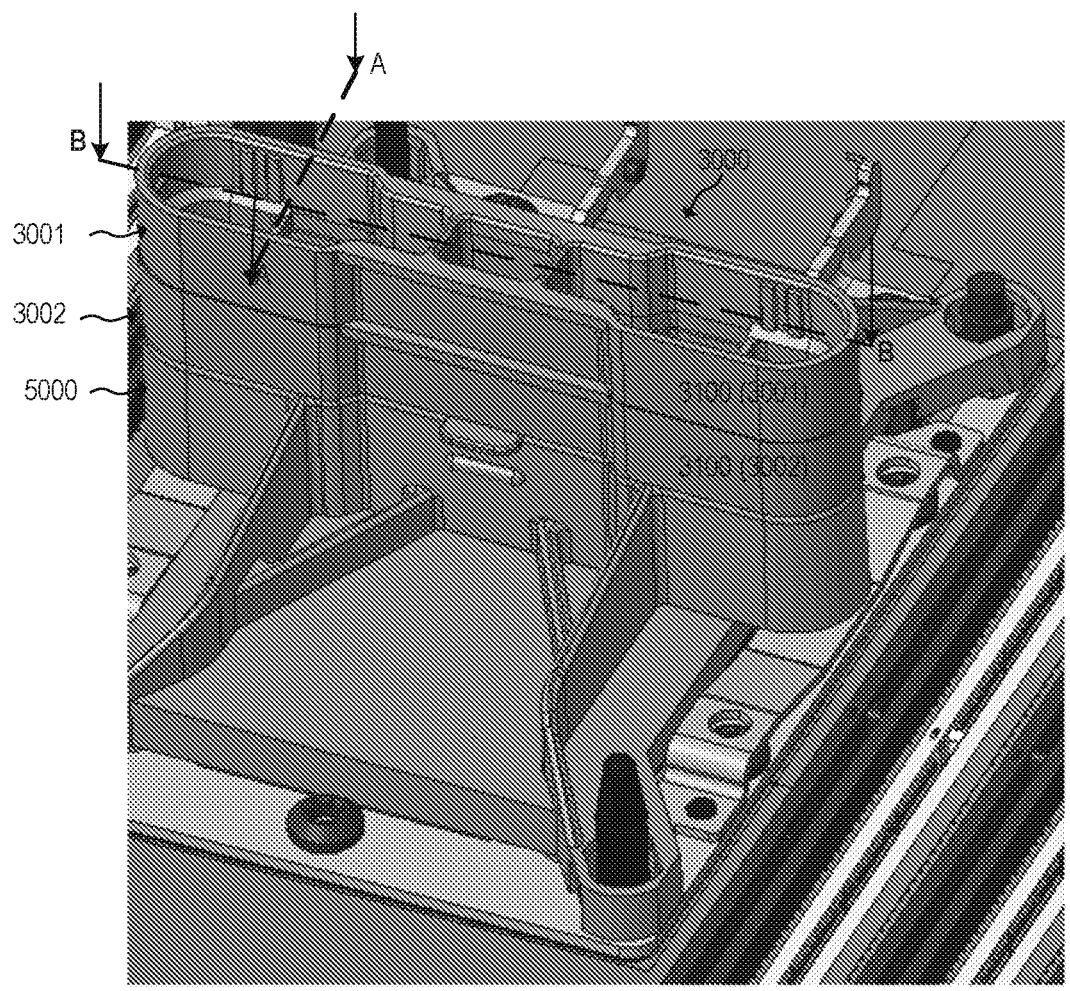
FIG. 8 illustrates an air impeding structure attached to a processing unit socket cover, according to some examples.

FIG. 8 illustrates a perspective view of an air impeding structure 3000 installed on a processing unit socket cover 5000. In some examples, air impeding structure 3000 may include a first baffle 3001 and a second baffle 3002, where the first baffle 3001 is stacked upon the first baffle 3002. While FIG. 5 shows air impeding structure 3000 with two baffles, air impeding structure 3000 is not limited to the number of baffles shown. For example, air impeding structure 3000 may have three baffles, four baffles, etc. stacked upon each other. Additionally, while FIG. 8 illustrates baffles 3001 and 3002 as two air impeding structures 2000 stacked upon each other, baffles 3001 and 3002 may also be two air impeding structures 1000 stacked upon each other.

Figure 9A:
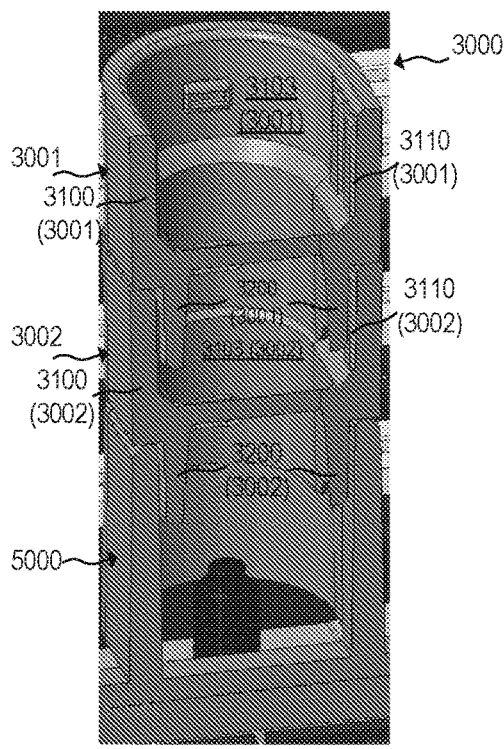
FIG. 9A illustrates a vertical cross-sectional view of the air impeding structure of FIG. 8 at line A-A, according to some examples.
Figure 9B:
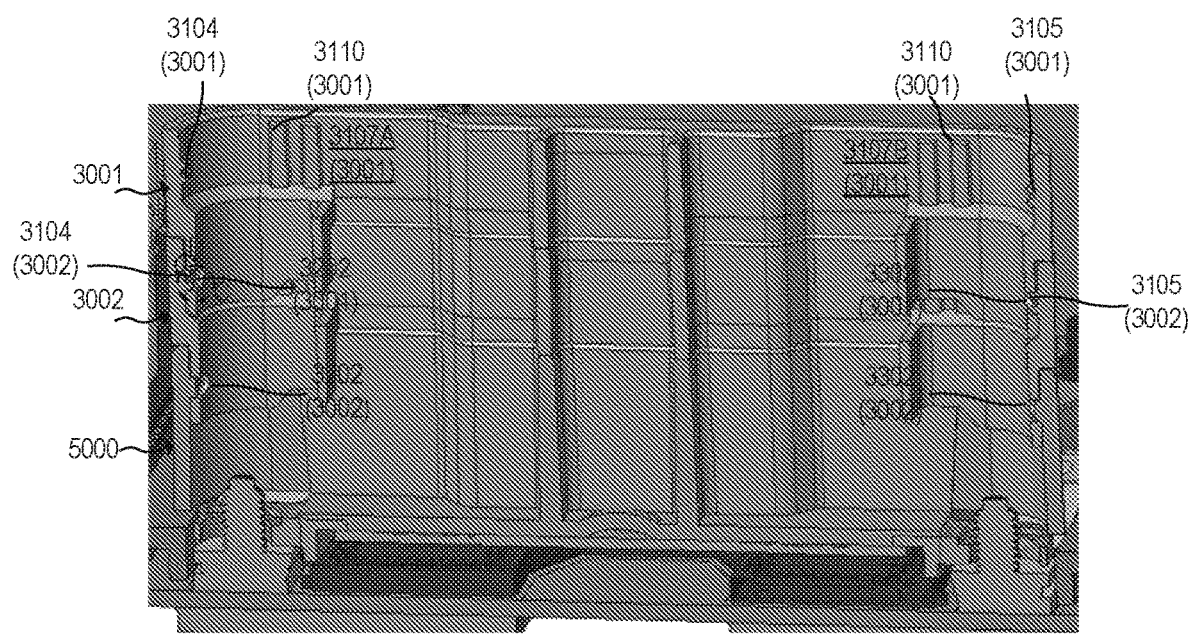
FIG. 9B illustrates a vertical cross-sectional view of the air impeding structure of FIG. 8 at line B-B, according to some examples.

FIG. 9A shows a vertical cross section of air impeding structure 3000 along line A-A of FIG. 8. FIG. 9B shows a vertical cross section of air impeding structure 3000 along line B-B of FIG. 8. As shown in FIGS. 8, 9A, and 9B, first baffle 3001 may have a first circumferential wall 3100 that encloses an interior space. Additionally, second baffle 3002 also may have a circumferential wall 3100 that encloses an interior space. In some examples, circumferential wall 3100 of first baffle 3001 may be characterized as a "first" circumferential wall and circumferential wall 3100 of second baffle 3002 may be characterized as a "second" circumferential wall. First baffle 3001 may have a first snap-in tab 3200 and a second snap-in tab 3300 (not labeled in FIG. 9B for clarity). Second baffle 3002 may also have a first snap-in tab 3200 and a second snap-in tab 3300. In some examples, first snap-in tab and second-snap-in tab of second baffle 3002 may be characterized as a "third" and a "fourth" snap-in tab, respectively. Similar to the snap-in tabs of air impeding structure 2000, the snap-in tabs of first baffle 3001 and second baffle 3002 may each comprise a circumferential wall enclosing interior spaces.

When first baffle 3001 is stacked upon second baffle 3002, only the circumferential walls of each are visible from the outside environment. The snap-in tabs of each baffle are not visible from the outside environment. Additionally, when first baffle 3001 is stacked upon second baffle 3002, some components of first baffle 3001 fit inside second baffle 3002. For example, first snap-in tab 3200 (and the enclosed interior space of first snap-in tab) of first baffle 3001 fits inside the circumferential wall 3100 (and interior space 3103) of second baffle 3002. Similarly, second snap-in tab 3300 (and the enclosed interior space of second snap-in tab) of first baffle 3001 fits inside the circumferential wall 3100 (and interior space) of second baffle 3001. Thus, the interior space of circumferential wall 3100 of second baffle 3002 may be characterized as a "lower" interior space and the interior space of circumferential wall 3100 of first baffle 3001 may be characterized as an "upper" interior space.

As shown in FIG. 9A, when first baffle 3001 is stacked on second baffle 3002, rib 3110 (3002) of second baffle 3002 engages with first snap-in tab 3200 of first baffle 3001. Similarly, second snap-in tab 3300 of first baffle 3001 may engage with a rib 3110 (3002) of second baffle. This is not visible in FIG. 9A due to the location of the vertical cross section. As shown in FIG. 9B, first baffle 3001 comprises a perforation 3202 in first snap-in tab 3200 and a perforation 3302 in second snap-in tab 3300. Second baffle 3002 comprises a first protrusion or a flange 3104 at one end of its main body and a second protrusion or flange 3105 at a second end of its main body. When first baffle 3001 is stacked upon second baffle 3002, the first protrusion 3104 engages with the perforation 3202 and the second protrusion 3105 engages with the perforation 3302. The engagement of the perforations and the protrusions and the engagement of the rib with the snap-in tabs allow for first baffle 3001 to be stacked upon second baffle 3002.

Figure 10A:
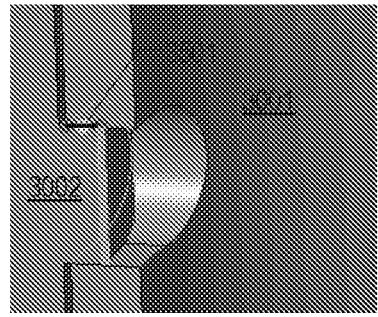
FIG. 10A illustrates a close-up view of section C of FIG. 9B, according to some examples.
Figure 10B:
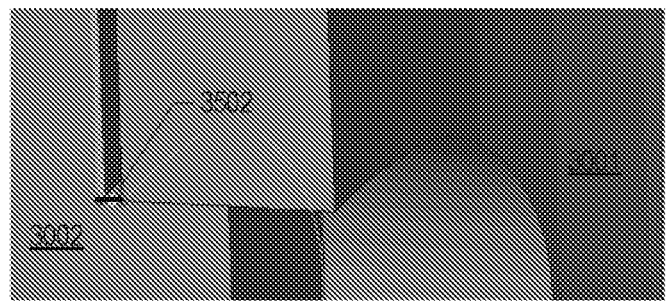
FIG. 10B illustrates a close-up view of section D of FIG. 9B, according to some examples.

FIG. 10A shows a close-up view of area C in FIG. 9B. FIG. 10B shows a close-up view of area D in FIG. 9B. FIG. 10A illustrates an overlap of the first baffle 3001 and the second baffle 3002 in the region of the perforation 3202 (3001) and flange 3104 (3002). The overlap measurement is labeled by 3501 in FIG. 10A. In some examples, the overlap can be characterized as the amount the flange of 3002 is inserted into the perforation 3001. In some examples, this overlap 3501 may be equal to an amount that provides sufficient friction for engagement. In some examples, this overlap may be from 0.4 mm to 0.6 mm. This overlap may also be characterized as an interference between the flange and the perforation. FIG. 10B illustrates a gap between the first baffle 3001 and the second baffle 3002. The gap measurement is labeled by 3502 in FIG. 10B. In some examples, the gap can be characterized as the amount of empty space between main body of second baffle 3002 and snap-in tab of first baffle 3001 when first baffle 3001 is stacked upon second baffle 3002. In some examples, this gap 3502 may be equal to an amount that provides sufficient friction for engagement but sufficient space and freedom for removing the first baffle 3001 from the second baffle 3002 (i.e. unstacking). In some examples, this gap may be from 0.05 mm to 1 mm.

In some examples, and as shown in FIGS. 8, 9A, and 9B, air impeding structure 3000 may be stacked upon processing unit socket cover 5000. In some examples, second baffle 3002 may be stacked upon processing unit socket cover 5000 in a similar manner that first baffle 3001 is stacked upon second baffle 3002. Accordingly, the snap-in tabs of second baffle 3002 may be inserted into the processing unit socket cover 5000. Additionally, processing unit socket cover 5000 may have flanges that correspond to perforations in first snap-in tab and second snap-in tab of second baffle 3002, as shown in FIG. 9B.

Air impeding structures 1000-3000 may be comprised of durable and flexible materials, including but not limited to different types of metals, thermoplastic polymers, such as polycarbonate and polycarbonate alloys (e.g., PC-ABS, Lexan, etc.), etc.

All of the features disclosed in this specification (including any accompanying claims, abstract and drawings), and/ or all of the elements of any method or process so disclosed, may be combined in any combination, except combinations where at least some of such features and/or elements are mutually exclusive.

What is claimed is:

1. An air impeding structure for a processing unit socket cover comprising:
   a main body with a first curved wall at a first end of the main body connected to a second curved wall at a second end of the main body, wherein the main body encloses an interior space;
   a first snap-in tab extending below the first end of the main body, wherein the first snap-in tab is recessed in relation to the first curved wall and comprises a perforation;
   a second snap-in tab extending below the second end of the main body, wherein the second snap-in tab is recessed in relation to the second curved wall; and
   a flange protruding from the first curved wall, wherein the flange is sized to engage the perforation.

2. The air impeding structure of claim 1,
   wherein the first snap-in tab comprises a curved portion; and
   wherein the second snap-in tab comprises a curved portion.

3. The air impeding structure of claim 2, wherein the curved portion of the first snap-in tab mirrors the first curved wall of the main body.

4. The air impeding structure of claim 1,
   wherein the first curved wall and the second curved wall are connected by two sidewalls.

5. The air impeding structure of claim 1, wherein the first snap-in tab comprises a circumferential wall that encloses a space inside the circumferential wall.

6. The air impeding structure of claim 1, wherein the main body has an internal surface with at least one rib protruding from the internal surface.

7. An air impeding structure for a processing unit socket cover comprising:
   a circumferential wall enclosing an upper interior space, the circumferential wall including:
      a first rounded end;
      a second rounded end;
      a first sidewall connecting the first rounded end and the second rounded end; and
      a second sidewall connecting the first rounded and the second rounded end;
   a first snap-in tab connected to the circumferential wall below the first rounded end, wherein the first snap-in tab encloses a first lower interior space; and
   a second snap-in tab connected to the circumferential wall below the second rounded end, wherein the second snap-in tab encloses a second lower interior space and the upper interior space is bigger than a combination of the first lower interior space and the second lower interior space.

8. The air impeding structure of claim 7,
   wherein the first snap-in tab is recessed in relation to the first rounded end.

9. The air impeding structure of claim 7,
   wherein the first snap-in tab comprises a curved portion; and
   wherein the second snap-in tab comprises a curved portion.

10. The air impeding structure of claim 7,
    wherein the first sidewall and the second sidewall do not intersect.

11. The air impeding structure of claim 7,
wherein the first rounded end comprises an internal surface with a protrusion.

12. The air impeding structure of claim 11,
wherein the first snap-in tab comprises a perforation sized to engage the protrusion.

13. An air impeding structure for a processing unit socket cover comprising:
a first baffle including:
a first circumferential wall enclosing an upper interior space;
a first snap-in tab extending below the first circumferential wall, wherein the first snap-in tab comprises an external surface with a first perforation; and
a second snap-in tab extending below the first circumferential wall, wherein the second snap-in tab comprises an external surface with a second perforation; and
a second baffle including:
a second circumferential wall enclosing a lower interior space, wherein the second circumferential wall comprises a first internal surface with a first flange and a second internal surface with a second flange;
a third snap-in tab extending below the second circumferential wall; and
a fourth snap-in tab extending below the second circumferential wall;
wherein the first flange engages with the first perforation; and
wherein the second flange engages with the second perforation.

14. The air impeding structure of claim 13,
wherein the first internal surface comprises at least one rib; and
wherein the at least one rib engages the external surface of the first snap-in tab.

15. The air impeding structure of claim 13,
wherein the first snap-in tab and the second snap-in tab fit inside the lower interior space.

16. The air impeding structure of claim 15,
wherein the second circumferential wall comprises a first rounded end and a second rounded end connected by two sidewalls;
wherein the third snap-in tab comprises a rounded portion parallel to the first rounded end; and
wherein the fourth snap-in tab comprises a rounded portion parallel to the second rounded end.

17. The air impeding structure of claim 13, wherein the second snap-in tab is recessed in relation to the first internal surface of the second circumferential wall.

\* \* \* \* \*